(No Model.)
J. A. KIRWIN.
CORD TENSION ATTACHMENT.
No. 557,831. Patented Apr. 7, 1896.
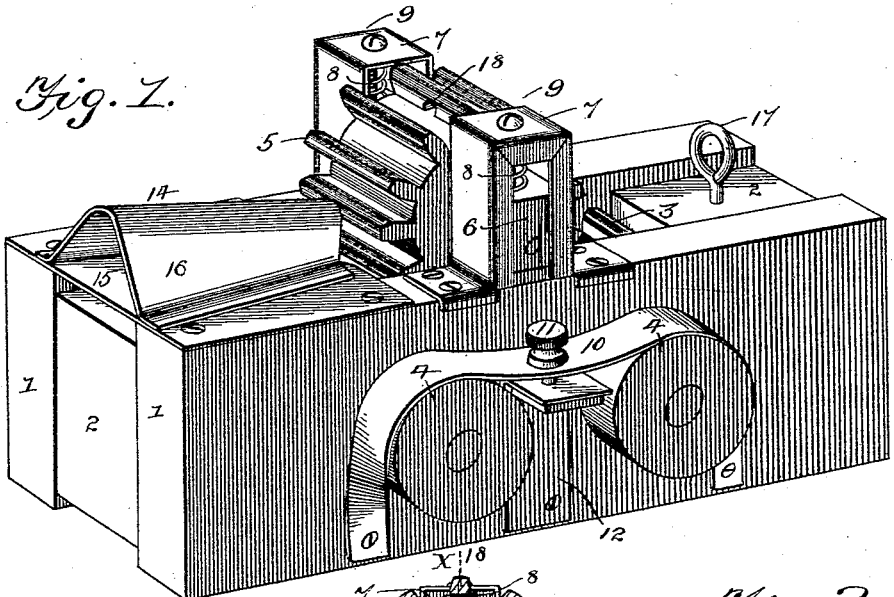
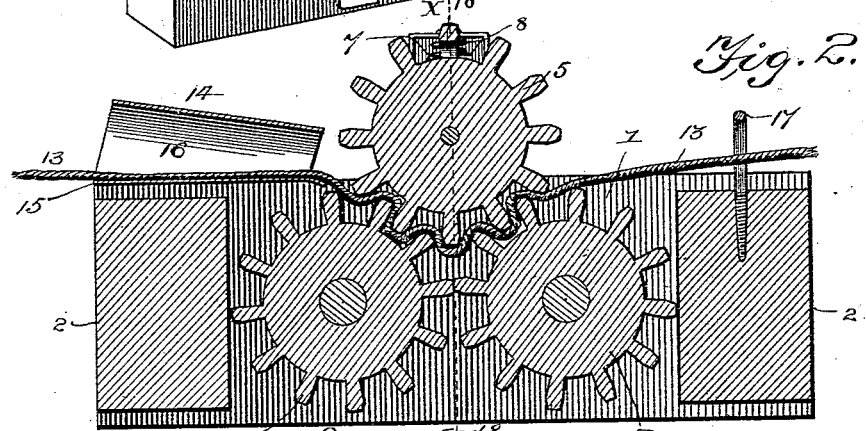
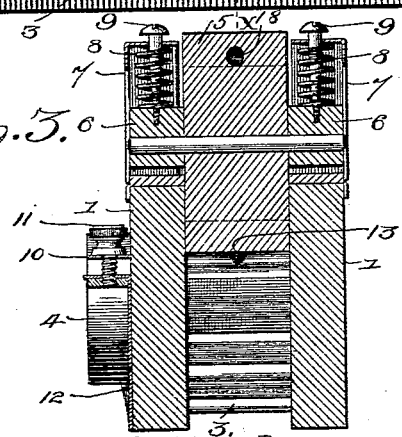
Witnesses
E. H. Monroe
V. B. Hillyard
Inventor
John A. Kirwin
By his Attorneys,
C. A. Snow & Co.

UNITED STATES PATENT OFFICE.

JOHN A. KIRWIN, OF SPRING VALLEY, MINNESOTA.

CORD-TENSION ATTACHMENT.

SPECIFICATION forming part of Letters Patent No. 557,831, dated April 7, 1896.

Application filed August 3, 1895. Serial No. 558,136. (No model.)

*To all whom it may concern:*

Be it known that I, JOHN A. KIRWIN, a citizen of the United States, residing at Spring Valley, in the county of Fillmore and State of Minnesota, have invented a new and useful Cord-Tension Attachment, of which the following is a specification.

This invention aims to provide a tension-regulating device for use on sewing-machines, harvester-binders, or in any place where it is required to subject a thread, cord, or line to a tension for any required purpose.

The invention is particularly designed for use in connection with harvester binding twine or cord, inasmuch as the latter is uneven, knotty, and formed with innumerable projecting ends of the strands comprising the same. The present device will adapt itself to the unevenness of the said twine or cord and will maintain a uniform tension thereon, and will at the same time obviate the stripping of the twine or cord.

Other objects and advantages are contemplated and will appear from the following description, taken in connection with the accompanying drawings, in which—

Figure 1 is a perspective view of a tension device constructed in accordance with the present invention. Fig. 2 is a longitudinal section thereof. Fig. 3 is a cross-section of the complete device on the line X X of Fig. 2.

The framework, which may be of any appropriate construction, is shown as consisting of similar side pieces 1 and end pieces 2. Two toothed wheels 3 are journaled in the side pieces of the framework and have friction-disks 4 on the projecting ends of one of their journals, and these toothed wheels are arranged in the same plane. A third toothed wheel 5 is placed opposite the space between the toothed wheels 3 and is of similar construction thereto, and the teeth of the toothed wheel 5 intermesh with the teeth of the toothed wheels 3. The toothed wheel 5 is journaled in yielding bearings and is capable of a movement to and from the toothed wheels 3, so as to yield on the passage of a knot or projection of the twine or cord when the latter is moving between the engaging surfaces of the said toothed wheels. The bearing-blocks 6, in which the journals of the toothed wheel 5 are mounted, are held in standards 7, and springs 8 are interposed between the closed ends of the standards 7 and the opposing ends of the bearing-blocks 6, so as to exert a pressure upon the bearing-blocks 6 to hold the toothed wheel 5 in engagement with the toothed wheels 3. Set-screws 9 are provided and operate in the closed ends of the standards 7, pass through the springs 8, and screw into the bearing-blocks 6, so as to regulate and vary the distance between the wheel 5 and the wheels 3, according to the thickness of the twine or cord passing between them. By this means provision is also had for regulating the distance between the coöperating teeth of the toothed wheels 5 and 3, as will be readily comprehended.

A band or strap 10, preferably of metal, passes over the edges of the friction-disks 4, and its end portions extend along the outer edges of the said friction-disks and have their extremities partially twisted and firmly attached to the adjacent side piece of the framework. A set-screw 11 engages with that portion of the band or strap 10 lying opposite the space between the friction-disks and engages with the horizontal portion of a bracket 12, attached to the framework and disposed between the inner edges of the disks 4. The threaded portion of the set-screw 11 engages with a correspondingly-threaded opening of the bracket 12, and by turning the said set-screw the said band or strap 10 can be caused to bind more or less tightly against the edges of the friction-disks 4, thereby regulating the resistance to the passage of the thread, twine, or cord 13 between the toothed wheels 3 and 5.

The thread or cord guide is arranged at one end of the framework, and consists, essentially, of a flaring tube 14, which is formed by means of a flat plate 15 and a superposed plate 16, the latter having its middle portion deflected or bent to form a substantially inverted-V trough, whose open side is closed by the plate 15 and which constitutes the flaring tube 14. An eye 17 is located at the opposite end of the framework and is in line with the flaring tube 14, and a straight line passing through the tube 14 and the eye 17 will come opposite a medial point between the sides of the toothed wheels.

To facilitate the passing of the thread or cord 13 between the toothed wheels 3 and 5, one of the said toothed wheels, as 5, has an opening 18 in one of its teeth, through which the end portion of the thread or cord is thrust. On rotating the toothed wheel 5, after the end portion of the thread or cord has been engaged with the opening 18 in the proper direction, the said thread or cord will be carried between the toothed wheels, as is manifest.

By having the wheels toothed the thread or cord is deflected in its passage therebetween and in moving causes a rotation of the several wheels upon their journals, and inasmuch as the rotation of the toothed wheels is retarded more or less by the frictional engagement and pressure of the band or strap 10 upon the friction disks 4, the tension upon the thread or cord can be regulated as required.

Inasmuch as the invention is designed for general application and for a variety of uses, it is obvious that in the embodiment thereof changes in the form, proportion, and the minor details of construction may be resorted to without departing from the principle or sacrificing any of the advantages of this invention.

Having thus described the invention, what is claimed as new is—

1. A tension device for the purposes specified, comprising a pair of toothed wheels, a third toothed wheel arranged opposite the space between and having its teeth meshing with the teeth of each of the said two toothed wheels, springs exerting a pressure on the bearings of the third toothed wheel to hold it in meshing relation with the two toothed wheels, means for varying the distance between the said third and other toothed wheels, and a brake mechanism applied to the said pair of toothed wheels and capable of exerting a greater or less pressure thereon for varying the tension on the cord passing between the intermeshing teeth of the three toothed wheels and by means of which the latter are positively rotated, substantially as set forth.

2. In a tension device, two oppositely-disposed toothed wheels, a tooth of one of the said wheels having an opening to receive the end of the thread or cord so as to carry the latter between the said wheels, and a brake mechanism for varying the resistance applied to retard the movements of the said wheels, substantially as set forth for the purpose described.

3. In combination, a pair of toothed wheels, friction-disks mounted upon the journals thereof, a strap secured at its ends and passing over the friction-disks, a set-screw adapted to engage with the strap at a point between the friction-disks so as to cause it to engage with a greater or less pressure against the engaging surfaces of the said disks, a third toothed wheel arranged opposite the space between the pair of toothed wheels and having its teeth meshing therewith, one tooth of the third toothed wheel having an opening for the purpose described, and suitable guides to give proper direction to the passage of the thread or cord between the intermeshing toothed wheels, substantially as specified.

In testimony that I claim the foregoing as my own I have hereto affixed my signature in the presence of two witnesses.

JOHN A. KIRWIN.

Witnesses:
FRED WENDORF,
OTTO WENDORF.